G. S. VAN VOORHIS.
TIRE SHOE OR CASING.
APPLICATION FILED NOV. 7, 1916.

1,236,506.

Patented Aug. 14, 1917.

Inventor:
George S. Van Voorhis,
by Spear Middleton Donaldson Spear
Atty's.

UNITED STATES PATENT OFFICE.

GEORGE S. VAN VOORHIS, OF BOSTON, MASSACHUSETTS.

TIRE SHOE OR CASING.

1,236,506.      Specification of Letters Patent.      Patented Aug. 14, 1917.

Application filed November 7, 1916. Serial No. 130,045.

*To all whom it may concern:*

Be it known that I, GEORGE S. VAN VOORHIS, a citizen of the United States, and resident of Boston, Massachusetts, have invented certain new and useful Improvements in Tire Shoes or Casings, of which the following is a specification.

My present invention relates to improvements in outer casings or shoes for double tube pneumatic tires. There are at present in general use two types of such casings, one known as the straight side of Dunlop type, and the other as the clencher quick detachable.

These casings are each manufactured to fit a special type of rim so that a Q. D. clencher cannot be used upon a rim adapted to receive a straight side tire and conversely a straight side tire cannot be used upon a clencher rim. This requires the dealer or retailer to carry practically a double quantity of tires in stock so as to be able to supply the needs of the individual customer according to the character of rim with which his car is equipped.

The object of the present invention is to provide a tire which will fit either a Q. D. clencher or a straight side rim, so that the dealer will only have to carry the various sizes of my improved tire and can sell them to purchasers equipped with either straight side or Q. D. clencher rims.

The invention includes the novel construction hereinafter described and particularly defined by the appended claims, an embodiment of the invention being illustrated in the accompanying drawing, in which—

Figure 1:
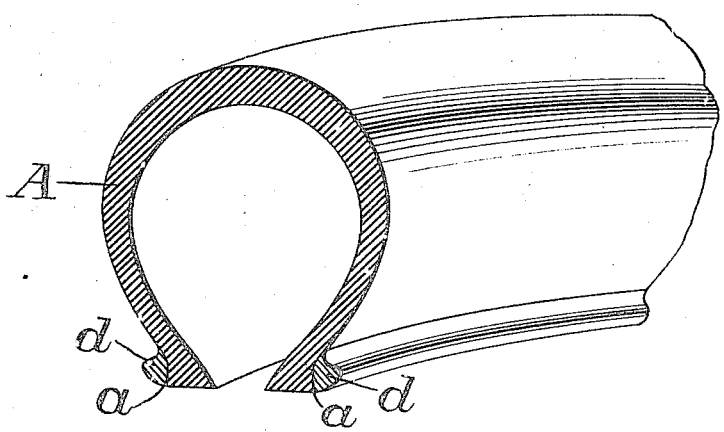
Figure 1 is a sectional perspective view of a sufficient portion of a tire embodying the invention to illustrate the same.
Figure 2:
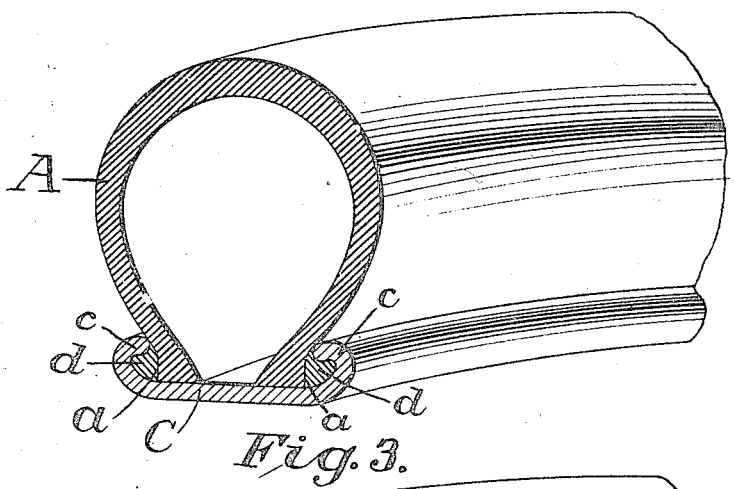
Fig. 2 is a similar view of the tire applied to a Q. D. clencher rim.
Figure 3:
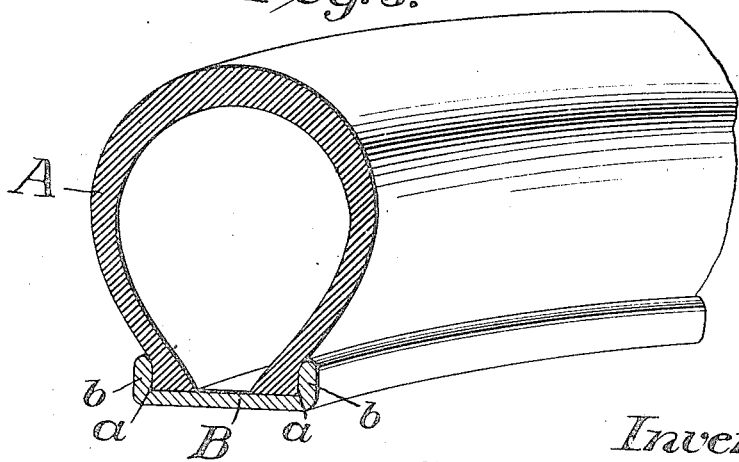
Fig. 3 is a similar view of the tire applied to a straight side rim after the clencher beads have been detached.

Referring by reference characters to this drawing, the letter A designates a tire which, so far as the body portion thereof is concerned, may be of the usual or any desired construction, being provided with the ordinary straight sides indicated at *a* adapted to be retained in position on the rim by the flanges *b* of the rim B. At C is shown a Q. D. clencher rim having the channeled side flanges *c* to receive the beaded edges of a clencher tire, and in order to provide a tire adaptable to either of the rims B and C, I secure to the outer edges of the casing A detachable clencher beads *d*, which, when the casing is applied to the clencher rim will fit the grooves or channels of the flanges *c*, the same as a standard clencher tire does.

These beads *d* are detachably connected with the edges of the casing during the process of manufacture, so that all tires or casings shipped to dealers by the manufacturer would be equipped with these detachable clencher beads.

If a casing is purchased by a motorist having a car equipped with clencher rims, it will be applied to the car as received and without removing the beads. If, however, a customer has a car provided with straight side rims, then the dealer or purchaser need only strip off the removable beads, thus converting the tire into a straight side tire.

By this means the number of casings which it is necessary for a dealer to carry in stock, is very largely reduced with the result in reduction of storage space required and money invested.

The beads may be very inexpensively produced and quickly attached to the edges of the straight side tire by the manufacturer by any suitable means, such as an adhesive.

The straight side and clencher rims indicated in the drawing at B and C are intended to be representative of any standard straight side and Q. D. clencher rims respectively, those shown in the drawings being representative of the split type having ends capable of being disconnected and one end sprung inwardly out of line with the other to permit the rim to contract sufficiently to permit the inextensible edges of the casings to be sprung over the flanges, but it is obvious that my improved tire can be applied equally as well to straight side and Q. D. clencher rims of the sectional channel type, to wit: those in which one of the flanges is capable of being removed.

Having thus described my invention what I claim is:

1. As an article of manufacture a tire shoe or casing of the clencher type so constructed that the beads which fit the clencher rim may be stripped off and the tire then becomes a straight side tire and fits a straight side rim, substantially as described.

2. As an article of manufacture, a tire shoe or casing having straight rim engaging sides and beads detachably secured to said sides and adapted when in position to fit the channels of the clencher rim, substantially as described.

In testimony whereof, I affix my signature.

GEORGE S. VAN VOORHIS.

Witnesses:
ALICE M. GARVIN,
ERLE O. BISHOP.